Sept. 6, 1966  H. I. JOHNSON ETAL  3,270,986
HAND-HELD SELF-MANEUVERING UNIT
Filed Dec. 3, 1965  3 Sheets-Sheet 1
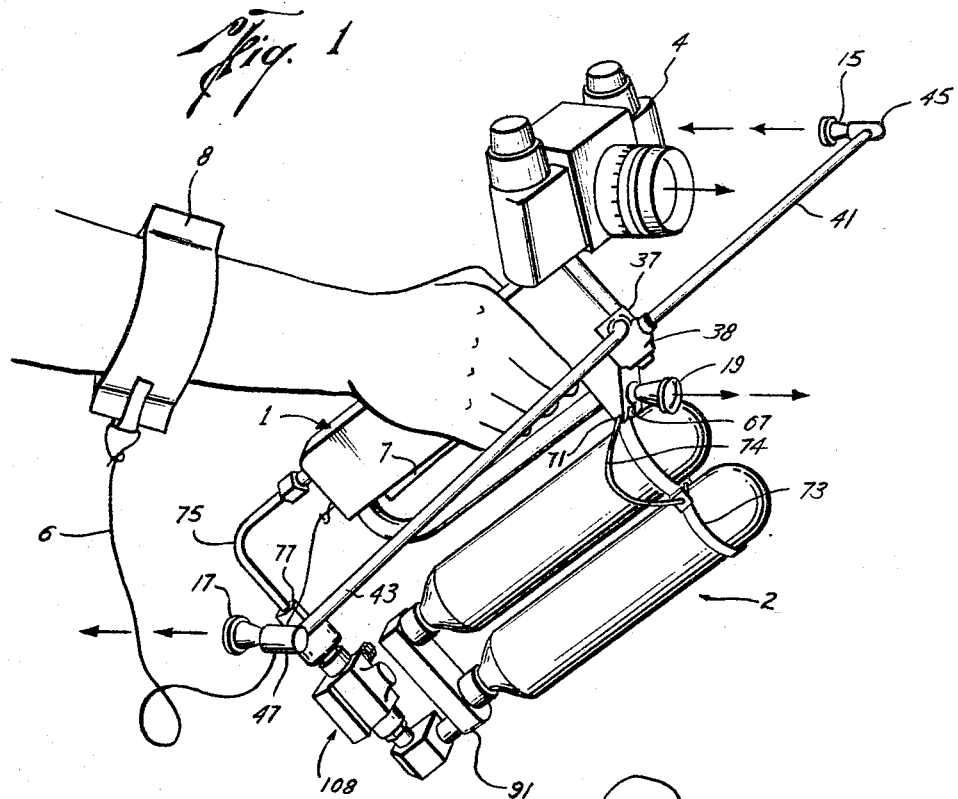
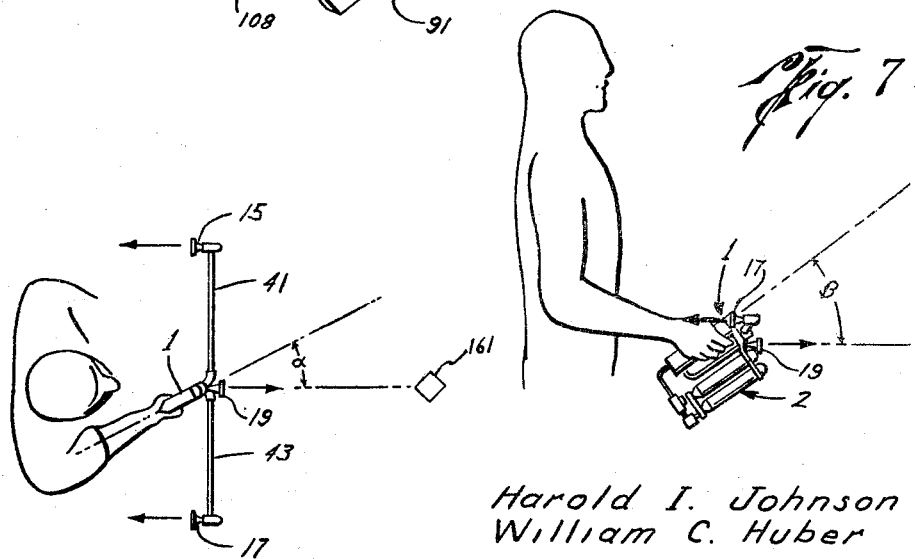
Harold I. Johnson
William C. Huber
INVENTORS
BY
ATTORNEYS

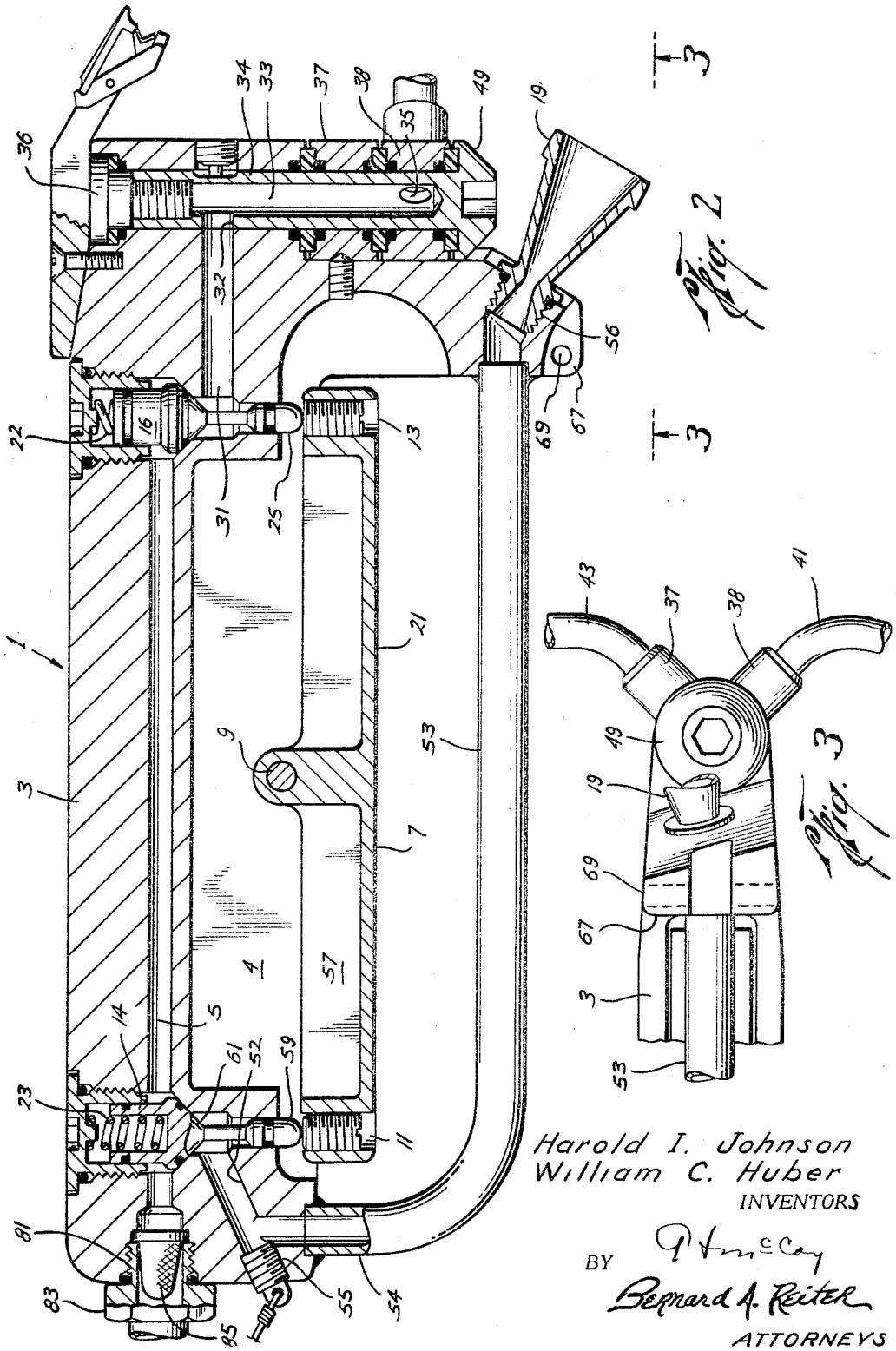

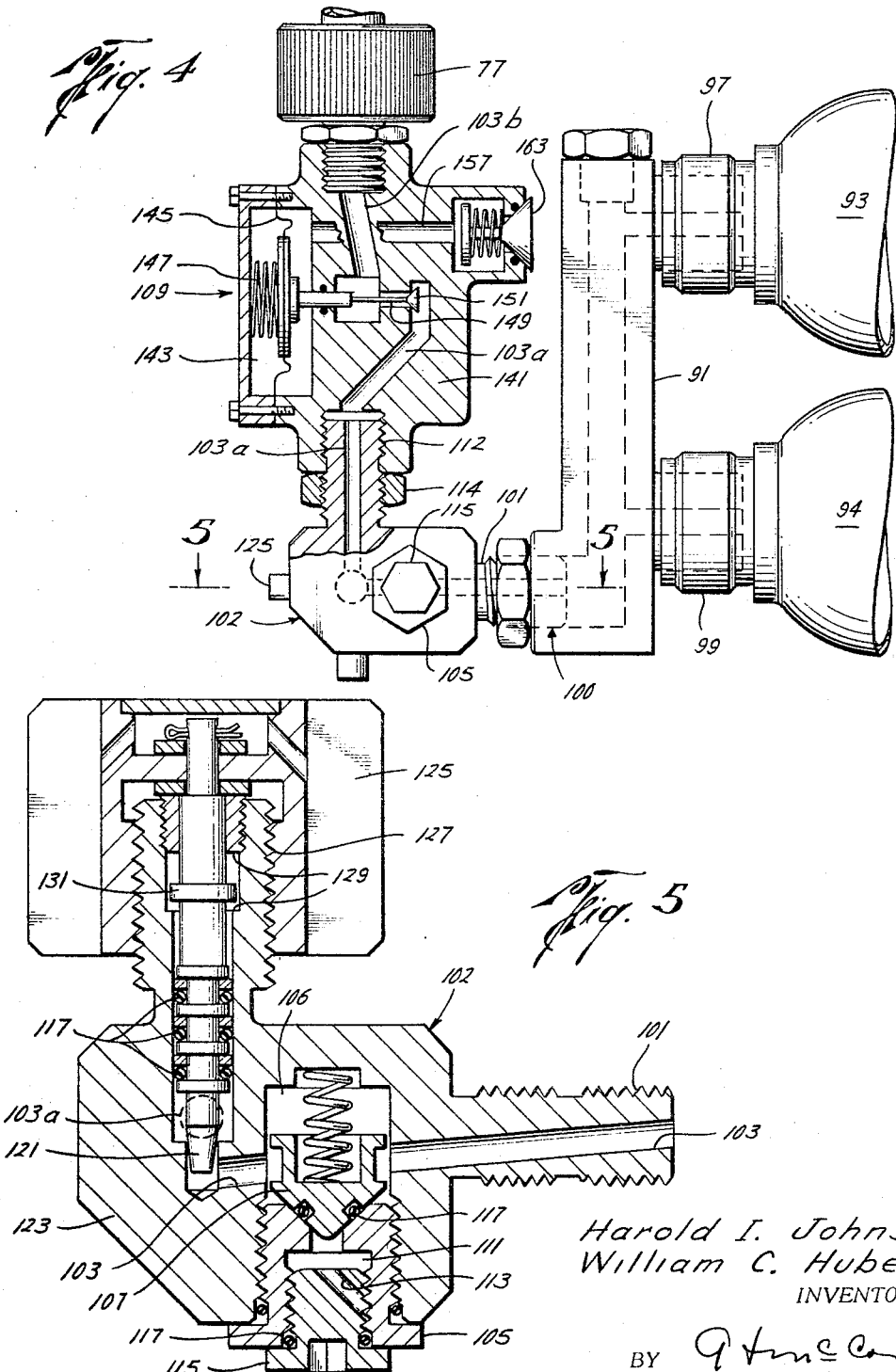

United States Patent Office 3,270,986
Patented Sept. 6, 1966

3,270,986
HAND-HELD SELF-MANEUVERING UNIT
Harold I. Johnson, Seabrook, and William C. Huber, League City, Tex., assignors to the United States of America as represented by the Administrator of the National Aeronautics and Space Administration
Filed Dec. 3, 1965, Ser. No. 511,567
10 Claims. (Cl. 244—4)

The invention described herein may be manufactured or used by or for the government of the United States of America without the payment of any royalties thereon or therefor.

The present invention relates to thrust devices and more particularly to a hand-held maneuvering unit capable of propulsion and attitude control of an astronaut in a zero or reduced gravity environment.

In the near future it is contemplated that man will engage in extensive activity in outer space requiring freedom of movement independently and apart from his space vehicle. These activities, such as the repair of space stations, satellites, exterior adjustments to space vehicles, and even physical movement on foreign planets will require a transportation and maneuvering device which is highly sophisticated in performance and yet simple to operate and use. In addition, the device must be extremely compact so as to be carried without obstructing or interfering with movements of the user and yet it must be capable of containing fuel sufficient for operation over an extended period of time. Also of utmost importance is the necessity for such a device to be extremely safe, reliable, and operative with any one of a variety of potential fuels.

It is to these and other ends that the present invention is directed. Briefly, it comprises a propulsion unit utilizing the thrust developed by a pressurized gas escaping from various nozzle means. The thrust is initiated by a rocking trigger mechanism designed to provide either forward or reverse movement of the operator. Deflection of the forward portion of the trigger opens a valve mechanism, allowing pressurized gas to escape from a pair of rearwardly directed nozzles to thus move the operator in a forward direction. Conversely, deflection of the rearward portion of the trigger opens a valve mechanism allowing pressurized gas to escape from a forwardly directed nozzle, thus tending to reduce velocity of forward movement to stop, or to cause reverse movement of the operator. In the preferred form of the invention, the fuel supply is affixed to and carried by the trigger housing in a pair of tanks and is fed thereto by a conduit and valve system which is operationally connected to the trigger. It will be seen however that this section may be removed so as to enable storage of greater fuel quantities at a point remote from the unit. Another feature of the invention resides in the compensated type poppet valves which are opened by trigger deflection and enable fuel flow proportionate to the magnitude of deflection. This provides a propelling thrust proportionate to the force applied to the trigger, thus insuring an accurate and responsive reaction from the propulsion unit at the desired time.

Still another feature of the invention is its numerous human engineering aspects such as the pivoted nozzle arms which preclude accidental forward firing when folded, the off-center design of the handle and nozzles which enhance ease of use, and by the single trigger mechanism for simplifying operation of the device in forward and reverse modes.

Other advantages and features of the invention, both as to its construction and mode of operation, will be readily appreciated as the same become better understood by reference to the following detailed description when considered in connection with the accompanying drawings in which like reference numerals designate like parts throughout the figures, and wherein:

FIG. 1 shows in perspective the operational form of the maneuvering device of the invention;

FIG. 2 is a longitudinal cross section view of the propulsion section of the maneuvering device of FIG. 1;

FIG. 3 is a bottom view as indicated by lines 3—3 of FIG. 2 showing the front portion of the propulsion section;

FIG. 4 is a cross section view of the high pressure section showing the pressure reduction valve and manifold assembly;

FIG. 5 is an enlarged cross section view taken on line 5—5 of FIG. 4 showing the fill valve assembly;

FIG. 6 is a top view of the unit held in operational position; and

FIG. 7 is a side view of the unit held in operational position.

With reference to FIG. 1 of the drawings, the maneuvering unit comprises two primary assemblies referred to as the propulsion unit 1 and high pressure section 2. The former includes the nozzles 15, 17, 19 and associated arm mechanisms, rocking trigger 7, and housing 3, while the latter includes fuel tanks 93, 94, manifold assembly 91, and high pressure valve assembly 108.

The propulsion unit 1 (FIGS. 1 and 2), includes main housing 3 through which there extends a hollow feedline 5 for transmitting fuel from the high pressure section 2 to the valves and various nozzle assemblies. The particular nozzles to which the fuel is transmitted is determined by the position of rocking trigger 7 which is connected to a longitudinal web 4 of housing 3 by pivot pin 9 approximately intermediate the length of said housing. Disposed in tapped apertures at each end of the rocking trigger is an adjustment screw 11, 13 for regulating the opening distance of the poppet valves 14, 16 when the trigger is depressed. These poppet valves are affixed in parallel tapped bores perpendicularly arranged with respect to the feedline 5 and at each end thereof. Fuel flow is initiated to the various nozzles by deflection of either the forward or rearward end of the rocking trigger 7. For example, upon depressing the front portion 21 of trigger 7 a counterclockwise movement occurs that compresses poppet contact 25 which in turn compresses spring 22 in the tapped bore. By so doing the spring bias force 22 which normally retains the poppet valve in a closed position is overcome thus opening the valve and allowing fuel to flow from feedline 5 into the horizontal transfer bore 31. The fuel traverses the horizontal transfer bore through hole 32 in frontal sleeve 34. The interior walls of sleeve 34 define a vertical transfer conduit 33. At the bottom end of this conduit is a pair of vertically separated but generally opposed apertures 35, only one of which may be shown (FIG. 2). Each of these apertures is in communicative relation with the left and right nozzle arms 41, 43 respectively. The frontal sleeve also includes at this end a swivel fitting bolt head 49 as an integral part thereof. The bolt head and sleeve 34 are retained in position by draw bolt 36 which is threaded into an upper internally tapped portion of the frontal sleeve to thereby draw it into fixed communicative relationship with the horizontal transfer bore 31.

Threadedly attached at the end of each nozzle arm 41, 43 is a nozzle block 45, 47, respectively, for receiving and transversely moving oxygen or other fuel to the nozzles. These members are generally cylindrical in shape, closed at their front end, and tap drilled at the rear so that tractor nozzles 15, 17 may each be screwed therein. The arms are connected at the ends opposite these nozzles to frontal sleeve 34 by means of swivel spools 37, 38 which slide over the sleeve 34 and rotate thereabout. As best shown in FIG. 1, the lefthand arm 41 is affixed to swivel spool 38 and the righthand arm 43 is affixed to swivel spool 37 which is disposed in axial abutting alignment above the first mentioned swivel spool. It is thus seen that the arms are retained in communicative relationship with vertical transfer bore 33 when they are open to extended position, and as they are folded back along the sides of the housing 3 the openings 35, 39 are closed to prevent transmission of fuel to the tractor nozzles 15, 17. In this manner each of the arms may be pivotally removed from the operative, fully extended position (shown in FIG. 1) to the inoperative position in which the arms are folded.

As with the front portion of rocking trigger 7, the rear portion 57 is arranged to abut a spring biased poppet contact 59. Application of hand force at this end of the trigger causes a clockwise rotation which raises the poppet contact 59 against the opposing force of its respective biasing spring 23, thus opening feed passageway 61 and allowing fuel to flow into the fuel lines 52, 54. As shown in FIGS. 2 and 3, fuel line 54 are disposed in the hollow trigger guard 53 and communicates with pusher nozzle 19 at the front end of the propulsion unit. A port plug 55 is threaded into fuel line 52 to retain fuel therein. This is necessitated by reason of constructional methods which arise from drilling of the bore forming fuel line 52 into the poppet valve bore. The pusher nozzle 19 is aligned with the fuel line and threaded into tapped aperture 56 at the front end of the propulsion unit. It is thus seen that the hollow trigger guard 53 serves not only to prevent accidental movement of trigger 7 but also provides a fuel conduit for the pusher nozzle 19.

The aforementioned high pressure section 2 is affixed to the propulsion unit at the front end by means of a pin 71 and clevis 67 construction and at the back end by the lock nut arrangement described hereinafter, see FIGS. 1 and 4. The clevis 67 contains a transverse aperture 69 (FIGS. 2 and 3) that receives lock pin 71 which is attached to the high pressure section by lanyard 74. The lanyard is fixedly tied to the tank strap 73 to insure against accidental displacement. To connect the front end of the high pressure section to the propulsion unit an extending apertured flange on the former is inserted into clevis 67. The pin 71 is then inserted through both aligned apertures to thus fixedly hold the sections together. The high pressure section is connected to the back end of the propulsion unit by manifold assembly 91 and by tube assembly 75 (FIG. 1) having at one end thereof a nut 77 in which is disposed a conventional male coupling shaft (not shown). Briefly, the manifold assembly 91 comprises an elongated member (FIG. 4) having three threaded entrance ways 97, 99, and 100. Two of these entrances 97, 99 are inserted in the fuel containers and threaded thereto by the attached nut members. The remaining entrance way 100 receives threaded male end 101 (FIG. 5) of fill valve 102. The fill valve, which is opened by adjuster nut 105 is in turn coupled with the pressure reducing valve 109 (FIG. 4), which supplies fuel to the maneuvering unit through the aforementioned tube assembly 75 upon actuation of the trigger.

As most clearly shown in FIG. 5, the fill valve 102 includes the threaded male end 101 having fuel conduit 103 therein. The conduit leads to cavity 106 containing spring loaded poppet valve 107 movably disposed with respect to the conduit 103. The adjuster nut 105 is threaded against the poppet valve 107 to retain it in place. A conventional safety passage 113 may be provided to prevent accidental explosion of threaded cap 115 when the latter is being removed for filling purposes. Sealing type O-rings generally indicated at 117 may be provided in the cap and other valving mechanisms to insure against leakage therethrough. The conduit 103 extends from valve cavity 106 into valve body section 123 whereupon it is closed by means of the plunger assembly 121. The plunger assembly is opened or closed by means of a butterfly handle 125 threaded onto the rear portion of housing 127. Cavity stop means 129 is provided within the housing so as to limit movement of the plunger shoulders 131. The passage of fuel through the fill valve is accomplished merely by opening the buterfly handle so as to permit back-up of plunger 121 thereby revealing the continuation (103a) of conduit 103 in the valve body section 123. Conduit (103a) is connected to pressure reducing valve (FIG. 4) by means of the aforementioned connection nut 114 threaded about the male extension 112 of the fill valve.

As shown best in FIG. 4, reducing valve 109 comprises main body section 141 having a sensing cavity 143 therein. The sensing cavity contains corrugated metal diaphragm 145 which is biased by spring 147 to maintain poppet 149 in a normally open position with respect to conduit 103b. Although the corrugated metal diaphragm and associated reference spring 147 may be adjusted for any desired pressure drop, the subject device is arranged for a constant pressure of 120 p.s.i. in the down stream conduit (103b) of the valve. Due to the possibility of a foreign object accidentally impinging on the head 151 of poppet 149 and thereby wedging the latter in a fixed open position in the conduit and impairing its pressure regulating function, a safety conduit 157 into sensing cavity 143 is provided. The conduit 157 in turn communicates with the cavity of the spring closed valve member 163 which opens to the atmosphere. It is thus seen that should the pressure reducing function of the primary poppet valve be destroyed or impaired, the resulting abnormal high pressure on the downstream side (103b) would cause valve 163 to open thereby venting excess pressure to the atmosphere.

In operation the hand-held maneuvering unit of the invention is held in one hand in a partially outstretched position, as shown in FIG. 7. To move in a forward direction the operator depresses the forward portion 21 of trigger 7 thus allowing pressurized gas to flow from the fuel tanks through the previously opened fill valve 102 and into pressure reducing valve 109, whereupon operation of the poppet and preset spring biased diaphragm means provides gas at the desired pressure to conduit 5 in the housing of the unit. As best shown in FIG. 2, the fluel flows into transfer conduits 31, 33 and into arms 41, 43 of the tractor nozzles as previously explained. The tractor nozzles 15, 17 of FIG. 1 exert a reactionary force, thereby pulling the operator in a forward direction. Should it be desired to reduce the velocity of forward motion, stop, or reverse direction, the operator merely slides his hand to rear portion 57 of the trigger whereupon compression of the poppet contact 59 opens the feed passageway 5 and allows fuel into lines 52, 54 which communicate with pusher nozzle 19 at the front of the unit. Reactionary force at this point acts against the operator thereby slowing or reversing his forward movement as explained above. It will be recognized that the magnitude of the velocity obtainable with the unit will be dependent upon the type of fuel used and also upon other factors such as pressure on the trigger and duration of its deflection.

Although oxygen gas has been found to be a satisfactory fuel for operation of the unit, it is contemplated that other types of fuels in either liquid or gaseous form may be used. For example, liquid hydrazine may be stored in the tanks and transmitted in liquid state through the unit whereupon it is converted to a high pressure gas by passage over a catalytic bed downstream of the nozzles. Similarly, flurocarbon fuels or the gaseous products resulting from the combustion of solid rocket fuels could be used in the maneuvering unit.

Referring now to FIGS. 6 and 7 there is shown the typical operational position and certain functional aspects of the maneuvering unit. It is seen, for example, that pusher nozzle 19 and tractor nozzles 15, 17 (FIG. 6) are disposed at an angle α to the axis of the housing 3. This permits the operator to hold the unit in a rather normal position without having to bend his wrist in order to point it in the direction he intends to move. For the same reason, that is physical comfort, the nozzle angles of the unit are pitched downwardly at an angle β with respect to the housing axis. It is apparent therefore that the device may be built for both right and lefthanded operators to avoid the physical exertion normally associated with periods of prolonged usage. To accomplish translational movement in the direction of a specific object 161, it is necessary only for the operator to visually align the pusher nozzle 19 with it and to then actuate the trigger. Because of its central location and coaxial alignment with the axis of operator's body, this nozzle serves as the sighting element, therefore eliminating need for the operator to pay specific attention to the position of tractor nozzles 15, 17. If the object, which the operator intends to move to is located in front of and above him, it is necessary only to point the pusher nozzle 19 at it since this would inherently move the tractor nozzles 15, 17 into the appropriate angular position to accomplish translational movement to said object. Although the reactionary forces of the maneuvering unit would normally be the only ones acting on the position and attitude of operator certain external forces may sometimes exert distributing or undesirable components to his direction of movement. For example, the operator while intending to translate in a forward direction, becomes aware of a slight rotational force caused by a tether line which tends to pivot him to the right, about his own longitudinal axis. In order to eliminate or dampen this rotational motion, he must move the maneuvering unit slightly to the right so that the combined thrust of nozzles 15, 17 has a resultant which is counterclockwise rather than linear. The degree to which the maneuvering unit is moved will of course be dependent upon several factors such as the speed of his rotational movement and upon the time available in which to dampen it. Similarly, if the operator detects an undesirable feet first (counterclockwise) (FIG. 7) pitching motion, such motion may be dampened or offset by lifting the maneuvering unit from its normal waist area position to one in the area of the chest or above depending upon the speed of the pitching motion and the time available in which to correct it.

While a particular embodiment of the invention has been shown and described herein, it is evident that numerous variations and modifications embodying the essential structural and human engineering features may be made. For example, in order to carry larger quantities of fuel or to reduce the size of the unit it may become necessary to remove the fuel containers and associated valving assembly from their fixed attachment to the propulsion unit. In such case these elements may be stored in the spacecraft or satellite adjacent the operator and connected to the unit by means of an extensible flexible hose. Likewise other changes such as the number of nozzles and shape of the unit may be made. The disclosed invention is therefore intended to cover all such changes and variations as lie within the spirit and scope of the invention and as defined in the claims appended hereto.

What is claimed and desired to be secured by Letters Patent is:

1. A propulsion and attitude control device for hand supported use by an astronaut in a reduced gravity environment comprising:
    a housing having conduits therein for conducting fuel to reaction nozzle means;
    reaction nozzle means affixed to said housing in operative communication with said conduits, said nozzle means adapted to emit pressurized gas so as to impart thrust to the unit; and
    an actuation means operatively connected to said housing for selectively directing fuel through said conduits to said nozzle means to thereby control translational and orientating movements of the astronaut.

2. The propulsion and attitude control device of claim 1 including:
    fuel storage means removably affixed to said housing; and
    fuel transmission means operatively connected to both said storage means and said housing conduits so that deflection of said actuation means causes fuel flow through said transmission means.

3. The propulsion and attitude control device of claim 1 wherein said reaction nozzle means includes a first nozzle means disposed to effect movement in a first direction and a second nozzle means disposed to effect movement in a second direction,
    each said first and second nozzle means operative independently and exclusively of the other by said actuation means.

4. The propulsion and attitude control device of claim 3 wherein said first nozzle means includes a first and second nozzle head;
    first and second nozzle arms having each said first and second nozzle heads respectively affixed at one end thereof; and
    the other end of each said nozzle arms pivotally mounted to said housing and extending on opposite sides thereof from a folded inoperative position adjacent the housing sides to a fully extended operative position.

5. The propulsion and attitude control device of claim 3 wherein:
    the axis of said first nozzle means is transverse to the longitudinal axis of said housing; and
    the axis of said second nozzle means is substantially coincident with the direction of forward movement and is parallel with the axis of said first nozzle means, said second nozzle means thereby providing a sighting element for movement in a forward direction.

6. The propulsion and attitude control device of claim 1 wherein said actuation means comprises:
    a pair of valves affixed in a housing conduit and normally preventing the flow of fuel therethrough;
    a trigger pivotally mounted intermediate its ends to said housing for opening said valves and permitting the flow of fuel through the conduit;
    each said valves disposed in operative relation to an end of said trigger so that rocking of said trigger in a first direction opens only one of said valves to allow fuel flow to a nozzle means and rocking of said trigger in a second direction opens another of said valves to permit fuel flow to another nozzle means, each said valves therefore operable exclusively of the other.

7. An astronaut's propulsion and attitude control unit for hand supported use in a reduced gravity environment comprising:
    a housing having conduits therein for transmitting fuel to various reaction nozzles;
    a fuel container having fuel transmission means affixed thereto and to the conduits in said housing;
    a pair of normally closed valves affixed in the housing conduits for selectively directing fuel therethrough;
    an elongated actuator pivotally affixed intermediate its ends to said housing; and
    each said pair of valves disposed adjacent the ends of said actuator and in operative relationship therewith so that pivotal movement of said actuator in a first direction opens only one of said valves to permit fuel flow to certain of the reaction nozzles and pivotal movement of the actuator in a second direction opens only the other of said valves to permit fuel flow to the other of the reaction nozzles, each said valves operable by said actuator exclusively of the other.

8. The propulsion and attitude control unit of claim 7, wherein:

said housing has a first nozzle means connected thereto and disposed to effect forward movement, and a second nozzle means connected thereto disposed to effect reverse movement; and each said nozzle means operatively connected by conduit means to only one of said mutually exclusive valves.

9. The propulsion and attitude control unit as recited in claim 8 wherein:

said first nozzle means includes a first and second nozzle head;

first and second nozzle arms having each said first and second nozzle heads respectively affixed to one end thereof; and the other end of each said nozzle arms pivotally mounted to said housing and extending on opposite sides thereof from a folded position adjacent the housing sides and in which fuel may not flow therethrough to a fully extended operative position.

10. The propulsion and attitude control unit as recited in claim 9, wherein:

the longitudinal axis of said housing is transverse to the axis of said nozzle means and the axis of said second nozzle means is substantially coincident with the direction of intended forward movement and is parallel with the axis of said first nozzle means, said second nozzle means thereby providing a sighting element for movement in a forward direction.

References Cited by the Examiner
UNITED STATES PATENTS

| | | | |
|---|---|---|---|
| 3,066,887 | 12/1962 | Moore | 244—4 |
| 3,107,069 | 10/1963 | Draim | 244—4 |

References Cited by the Applicant
UNITED STATES PATENTS

| | | |
|---|---|---|
| 2,509,603 | 5/1950 | Marin. |
| 3,021,095 | 2/1962 | Moore. |
| 3,063,663 | 11/1962 | Rickards. |
| 3,107,069 | 10/1963 | Draim. |
| 3,121,440 | 2/1964 | Heller. |

MILTON BUCHLER, *Primary Examiner.*

A. E. CORRIGAN, *Assistant Examiner.*